United States Patent
Carlson

(10) Patent No.: US 8,023,657 B2
(45) Date of Patent: *Sep. 20, 2011

(54) CRYPTOGRAPHY AND CERTIFICATE AUTHORITIES IN GAMING MACHINES

(75) Inventor: Rolf E Carlson, Albuquerque, NM (US)

(73) Assignee: Atwater Ventures Limited (BS)

( * ) Notice: Subject to any disclaimer, the term of this patent is extended or adjusted under 35 U.S.C. 154(b) by 834 days.

This patent is subject to a terminal disclaimer.

(21) Appl. No.: 11/841,557

(22) Filed: Aug. 20, 2007

(65) Prior Publication Data

US 2008/0032788 A1    Feb. 7, 2008

Related U.S. Application Data

(63) Continuation of application No. 09/698,507, filed on Oct. 26, 2000, now Pat. No. 7,260,834.

(60) Provisional application No. 60/161,591, filed on Oct. 26, 1999.

(51) Int. Cl.
    *H04L 9/08*    (2006.01)
(52) U.S. Cl. ....................................... 380/278
(58) Field of Classification Search ........................ None
    See application file for complete search history.

(56) References Cited

U.S. PATENT DOCUMENTS

| | | |
|---|---|---|
| 3,309,509 A | 3/1967 | Vasseur |
| 4,093,223 A | 6/1978 | Wilke et al. |
| 4,179,663 A | 12/1979 | Vasseur |
| 4,240,635 A | 12/1980 | Brown |
| 4,339,798 A | 7/1982 | Hedges et al. |
| 4,405,829 A | 9/1983 | Rivest et al. |
| 4,441,714 A | 4/1984 | Goott |
| 4,467,424 A | 8/1984 | Hedges et al. |
| 4,510,495 A | 4/1985 | Sigrimis et al. |
| 4,527,798 A | 7/1985 | Siekierski et al. |
| 4,582,324 A | 4/1986 | Koza et al. |
| 4,636,951 A | 1/1987 | Harlick |
| 4,652,998 A | 3/1987 | Koza et al. |
| 4,786,056 A | 11/1988 | Dunnigan |
| 4,819,818 A | 4/1989 | Simkus et al. |
| 4,856,787 A | 8/1989 | Itkis |
| 4,920,432 A | 4/1990 | Eggers et al. |
| 4,926,256 A | 5/1990 | Nanba |
| 4,943,062 A | 7/1990 | Gillette |

(Continued)

FOREIGN PATENT DOCUMENTS

CA    2501725    10/2003

(Continued)

OTHER PUBLICATIONS

Office Action dated Oct. 20, 2008 in U.S. Appl. No. 10/913,301.

(Continued)

*Primary Examiner* — Brandon S Hoffman
(74) *Attorney, Agent, or Firm* — Knobbe Martens Olson & Bear LLP

(57) ABSTRACT

The casino gaming system includes gaming machines and a gaming server having keys. A network bus interconnects the gaming machines and the gaming server. The network bus provides a communication link to transmit information between the gaming machine and the gaming server. The gaming server transmits keys over the network bus to the gaming machines. The gaming machines use the keys to encrypt information, and the gaming machines transmit the encrypted information over the network bus and/or an outside network connected to the gaming server.

26 Claims, 5 Drawing Sheets

U.S. PATENT DOCUMENTS

| | | | |
|---|---|---|---|
| 4,977,596 | A | 12/1990 | Maestas et al. |
| 4,998,199 | A | 3/1991 | Tashiro et al. |
| 5,013,038 | A | 5/1991 | Luxenberg et al. |
| 5,083,272 | A | 1/1992 | Walker et al. |
| 5,112,050 | A | 5/1992 | Koza et al. |
| 5,128,752 | A | 7/1992 | Von Kohorn |
| 5,165,091 | A | 11/1992 | Lape et al. |
| 5,228,077 | A | 7/1993 | Darbee |
| 5,251,165 | A | 10/1993 | James, III |
| 5,326,104 | A | 7/1994 | Pease et al. |
| 5,330,185 | A | 7/1994 | Wells |
| 5,356,144 | A | 10/1994 | Fitzpatrick et al. |
| 5,361,323 | A | 11/1994 | Murata et al. |
| 5,396,440 | A | 3/1995 | Coburn |
| 5,398,932 | A | 3/1995 | Eberhardt et al. |
| 5,417,424 | A | 5/1995 | Snowden et al. |
| 5,420,928 | A | 5/1995 | Aiello et al. |
| 5,429,361 | A | 7/1995 | Raven et al. |
| 5,434,560 | A | 7/1995 | King et al. |
| 5,457,306 | A | 10/1995 | Lucero |
| 5,481,542 | A | 1/1996 | Logston et al. |
| 5,488,411 | A | 1/1996 | Lewis |
| 5,511,784 | A | 4/1996 | Furry et al. |
| 5,515,307 | A | 5/1996 | Aiello et al. |
| 5,526,035 | A | 6/1996 | Lappington et al. |
| 5,528,526 | A | 6/1996 | Klug et al. |
| 5,575,717 | A | 11/1996 | Houriet et al. |
| 5,634,849 | A | 6/1997 | Abecassis |
| 5,643,086 | A | 7/1997 | Alcorn et al. |
| 5,659,569 | A | 8/1997 | Padovani et al. |
| 5,668,945 | A | 9/1997 | Ohba et al. |
| 5,668,950 | A | 9/1997 | Kikuchi et al. |
| 5,689,561 | A | 11/1997 | Pace |
| 5,695,400 | A | 12/1997 | Fennell et al. |
| 5,707,286 | A | 1/1998 | Carlson |
| 5,762,552 | A | 6/1998 | Vuong et al. |
| 5,770,533 | A | 6/1998 | Franchi |
| 5,790,677 | A | 8/1998 | Fox et al. |
| 5,830,069 | A | 11/1998 | Soltesz et al. |
| 5,857,025 | A | 1/1999 | Anderson et al. |
| 5,860,862 | A | 1/1999 | Junkin |
| 5,867,577 | A | 2/1999 | Patarin |
| 5,954,582 | A | 9/1999 | Zach |
| 5,964,660 | A | 10/1999 | James et al. |
| 5,971,849 | A * | 10/1999 | Falciglia ......................... 463/16 |
| 6,001,016 | A | 12/1999 | Walker et al. |
| 6,002,772 | A | 12/1999 | Saito |
| 6,012,983 | A | 1/2000 | Walker et al. |
| 6,071,190 | A | 6/2000 | Weiss et al. |
| 6,099,408 | A | 8/2000 | Schneier et al. |
| 6,117,010 | A | 9/2000 | Canterbury et al. |
| 6,142,872 | A | 11/2000 | Walker et al. |
| 6,149,522 | A | 11/2000 | Alcorn |
| 6,183,362 | B1 | 2/2001 | Boushy |
| 6,210,274 | B1 | 4/2001 | Carlson |
| 6,233,577 | B1 * | 5/2001 | Ramasubramani et al. .......... 1/1 |
| 6,234,898 | B1 | 5/2001 | Belamant et al. |
| 6,264,560 | B1 | 7/2001 | Goldberg et al. |
| 6,272,223 | B1 | 8/2001 | Carlson |
| RE37,414 | E | 10/2001 | Harlick |
| 6,370,249 | B1 | 4/2002 | Van Oorschot |
| 6,428,413 | B1 | 8/2002 | Carlson |
| 6,431,983 | B2 | 8/2002 | Acres |
| 6,450,885 | B2 | 9/2002 | Schneier et al. |
| 6,508,709 | B1 | 1/2003 | Karmarkar |
| 6,527,638 | B1 | 3/2003 | Walker et al. |
| 6,607,439 | B2 | 8/2003 | Schneier et al. |
| 6,676,522 | B2 | 1/2004 | Rowe et al. |
| 6,682,421 | B1 | 1/2004 | Rowe et al. |
| 6,711,264 | B1 | 3/2004 | Matsumoto et al. |
| 6,757,825 | B1 | 6/2004 | MacKenzie et al. |
| 6,805,634 | B1 | 10/2004 | Wells et al. |
| 6,816,966 | B1 | 11/2004 | Gupta et al. |
| 6,846,238 | B2 | 1/2005 | Wells |
| 6,986,055 | B2 | 1/2006 | Carlson |
| 7,168,089 | B2 | 1/2007 | Nguyen et al. |
| 7,260,834 | B1 | 8/2007 | Carlson |
| 2002/0032049 | A1 | 3/2002 | Walker et al. |
| 2002/0071557 | A1 | 6/2002 | Nguyen |
| 2002/0094858 | A1 | 7/2002 | Yacenda |
| 2002/0094871 | A1 | 7/2002 | Luciano et al. |
| 2002/0098888 | A1 | 7/2002 | Rowe et al. |
| 2002/0103027 | A1 | 8/2002 | Rowe et al. |
| 2002/0103028 | A1 | 8/2002 | Carter et al. |
| 2002/0115487 | A1 | 8/2002 | Wells |
| 2002/0116615 | A1 | 8/2002 | Nguyen et al. |
| 2002/0123966 | A1 | 9/2002 | Chu et al. |
| 2002/0128055 | A1 | 9/2002 | Adams et al. |
| 2002/0129249 | A1 | 9/2002 | Maillard et al. |
| 2002/0129429 | P1 | 9/2002 | Maillard et al. |
| 2002/0132663 | A1 | 9/2002 | Cumbers |
| 2002/0132666 | A1 | 9/2002 | Lind et al. |
| 2002/0137217 | A1 | 9/2002 | Rowe |
| 2002/0138594 | A1 | 9/2002 | Rowe |
| 2002/0138600 | A1 | 9/2002 | Singhai |
| 2002/0142842 | A1 | 10/2002 | Easley et al. |
| 2002/0142844 | A1 | 10/2002 | Kerr |
| 2002/0147047 | A1 | 10/2002 | Letovsky et al. |
| 2002/0151363 | A1 | 10/2002 | Letovsky et al. |
| 2002/0155887 | A1 | 10/2002 | Criss-Puszkiewicz et al. |
| 2002/0165023 | A1 | 11/2002 | Brosnan et al. |
| 2003/0054880 | A1 | 3/2003 | Lam et al. |
| 2003/0078103 | A1 | 4/2003 | LeMay et al. |
| 2003/0100372 | A1 | 5/2003 | Gatto et al. |
| 2003/0233542 | A1 | 12/2003 | Benaloh |
| 2004/0002385 | A1 | 1/2004 | Nguyen |
| 2004/0111369 | A1 | 6/2004 | Lane et al. |
| 2004/0151366 | A1 | 8/2004 | Nefian et al. |
| 2004/0198494 | A1 | 10/2004 | Nguyen et al. |
| 2004/0209660 | A1 | 10/2004 | Carlson |
| 2005/0193209 | A1 | 9/2005 | Saunders et al. |
| 2005/0224858 | A1 | 10/2005 | Hung et al. |
| 2006/0165235 | A1 | 7/2006 | Carlson |
| 2008/0254878 | A1 | 10/2008 | Saunders et al. |
| 2008/0254891 | A1 | 10/2008 | Saunders et al. |
| 2008/0254892 | A1 | 10/2008 | Saunders et al. |
| 2008/0254897 | A1 | 10/2008 | Saunders et al. |
| 2008/0261679 | A1 | 10/2008 | Carlson |
| 2008/0287181 | A1 | 11/2008 | Carlson |
| 2009/0088240 | A1 | 4/2009 | Saunders et al. |
| 2009/0088257 | A1 | 4/2009 | Saunders et al. |
| 2009/0088258 | A1 | 4/2009 | Saunders et al. |
| 2009/0093311 | A1 | 4/2009 | Saunders et al. |
| 2009/0093312 | A1 | 4/2009 | Carlson |

FOREIGN PATENT DOCUMENTS

| | | |
|---|---|---|
| EP | 0715245 | 6/1996 |
| EP | 1061430 | 12/2000 |
| EP | 1074955 | 2/2001 |
| WO | WO 02/05229 | 1/2002 |
| WO | WO 03/085613 A1 | 10/2003 |
| WO | WO 2004/034223 | 4/2004 |

OTHER PUBLICATIONS

Office Action dated Mar. 27, 2009 in U.S. Appl. No. 10/913,301.
Office Action dated Feb. 8, 2010 in U.S. Appl. No. 12/102,832.
International Search Report for Application No. PCT/US03/032153 dated Oct. 15, 2004.
Office Action dated Jan. 7, 2007 in U.S. Appl. No. 08/358,242.
Office Action dated Aug. 14, 2006 in U.S. Appl. No. 10/658,836.
Office Action dated Feb. 20, 2007 in U.S. Appl. No. 10/658,836.
Office Action dated Oct. 31, 2007 in U.S. Appl. No. 10/658,836.
Office Action dated Jul. 8, 1999 in U.S. Appl. No. 08/959,575.
Office Action dated Oct. 27, 1999 in U.S. Appl. No. 08/959,575.
Office Action dated May 23, 2000, in U.S. Appl. No. 08/959,575.
Office Action dated Dec. 20, 2000, in U.S. Appl. No. 08/959,575.
Office Action dated Jun. 19, 2001 in U.S. Appl. No. 09/143,907.
Office Action dated May 1, 2002 in U.S. Appl. No. 09/143,907.
Office Action dated Dec. 1, 2004, in U.S. Appl. No. 09/143,907.
Office Action dated Jan. 11, 2005 in U.S. Appl. No. 09/143,907.
Office Action dated Apr. 7, 2009 in U.S. Appl. No. 11/302,564.
Office Action dated Dec. 24, 2009 in U.S. Appl. No. 11/302,564.
Office Action dated Oct. 23, 2000 in U.S. Appl. No. 09/143,908.
Office Action dated Dec. 8, 2004 in U.S. Appl. No. 09/698,507.

Office Action dated Jan. 13, 2005 in U.S. Appl. No. 09/698,507.
Office Action dated Oct. 5, 2005 in U.S. Appl. No. 09/698,507.
Office Action dated May 19, 2006 in U.S. Appl. No. 09/698,507.
Office Action dated Dec. 11, 2006 in U.S. Appl. No. 09/698,507.
International Search Report for Application No. PCT/US03/09669 dated Jul. 31, 2003.
Office Action dated Jun. 18, 2010 in U.S. Appl. No. 12/102,832.
Office Action dated Apr. 13, 2010 in U.S. Appl. No. 12/331,331.
Examiner's First Report on Australian App. No. 2003282576, dated Nov. 20, 2009.
Office Action dated Jul. 6, 2010 in U.S. Appl. No. 11/302,564.
Declaration of Interference filed Mar. 5, 2010 in Patent Interference No. 105,747 (RES), *Legal iGaming* v. *IGT*.
Errata Sheet dated Mar. 18, 2010 in Patent Interference No. 105,747 (RES), *Legal iGaming* v. *IGT*.
Order Authorizing Motions dated May 3, 2010 in Patent Interference No. 105,747 (RES), *Legal iGaming* v. *IGT*.
Legal iGaming List of Proposed Motions dated Apr. 28, 2010 in Patent Interference No. 105,747 (RES), *Legal iGaming* v. *IGT*.
IGT Motion List dated Apr. 28, 2010 in Patent Interference No. 105,747 (RES), *Legal iGaming* v. *IGT*.
Legal iGaming List of Exhibits Filed and Served on Jul. 16, 2010 in Patent Interference No. 105,747 (RES), *Legal iGaming* v. *IGT*.
IGT Notice of Filing of Exhibits 1001-1008 dated Jun. 4, 2010 in Patent Interference No. 105,747 (RES), *Legal iGaming* v. *IGT*.
Legal iGaming Opposition 1 dated Jul. 16, 2010 in Patent Interference No. 105,747 (RES), *Legal iGaming* v. *IGT*.
IGT Substantive Motion 1 (for Judgment Based on No Interference-in-Fact), dated Jun. 4, 2010 in Patent Interference No. 105,747 (RES), *Legal iGaming* v. *IGT*.
Declaration of Chris Lundy (in support of IGT Substantive Motion 1), dated Jun. 4, 2010 in Patent Interference No. 105,747 (RES), *Legal iGaming* v. *IGT*.
Office Action dated Feb. 8, 2006 in U.S. Appl. No. 10/116,424.
First Declaration of Charles R. Berg, dated Jul. 14, 2010 in Patent Interference No. 105,747 (RES), *Legal iGaming* v. *IGT*.
Transcript of videotaped deposition of Christopher Lundy, dated Jun. 30, 2010 in Patent Interference No. 105,747 (RES), *Legal iGaming* v. *IGT*.

\* cited by examiner

CRYPTOGRAPHY AND CERTIFICATE AUTHORITIES IN GAMING MACHINES

CROSS-REFERENCE TO RELATED APPLICATIONS

This application is a continuation of U.S. application Ser. No. 09/698,507, filed Oct. 26, 2000, now U.S. Pat. No. 7,260,834, which claims priority under 35 U.S.C. §119(e) of U.S. Provisional App. No. 60/161,591, filed Oct. 26, 1999. The above referenced applications are hereby incorporated by reference in their entirety.

BACKGROUND OF THE INVENTION

1. Field of the Invention

The present invention relates to an apparatus and method for encrypting communications on a network bus in a gaming system, and more particularly, to an apparatus and method where a certificate authority server manages keys used to secure communications on a network bus in a gaming system.

2. Description of the Related Art

Conventional gaming machines include a processor, a rules library, a random number generator and an interactive display. In the casino, these conventional gaming devices are, typically, stand-alone type machines. Increasingly, the gaming machines in a casino are networked via a network bus to a gaming server. This networking is desired because it allows the casino to monitor wagering and other activities performed at each of the networked gaming machines. Since the monitoring of wagering and other activities performed at each of the networked gaming machines can include financial information, the casino desires that the communications over the network bus be secure.

In considering secure gaming communications, there are several important goals that should be addressed. The network bus should ensure privacy. Privacy, also termed confidentiality, is the condition where the information is kept secret from all but those authorized to access the information. In the gaming environment, privacy can apply to the transmitted information as well as the identity of a player of the gaming machines.

In addition, information transmitted over the network bus should be authenticated. Authentication ensures that the content, integrity of the transmitted information, origin of the transmitted information, date of transmission, time of transmission and other attributes of the transmitted information have not been tampered with during transmission.

Additionally, entities transmitting information over the network bus should not be capable of repudiating the transmission. Cryptographic services that facilitate non-repudiation prevent a player and/or a casino from denying a previous action or commitment. The casino desires non-repudiation, especially, to enforce payment by a player that has wagered and lost. Conversely, the player desires non-repudiation to enforce payment by the casino when the player wins.

As a result of networking of the gaming machines, the ubiquity of the Internet, greater connectivity between networks, and the support for electronic commerce both inside and outside the casino, the casino desires secure communications over the network bus that provides privacy, authentication and non-repudiation. Therefore, a need exists to provide these services to support secure communication over the network bus between the gaming server and the gaming machines in a casino.

In addition, the casino may decide or desire to connect the gaming server and, hence, the network bus and all networked gaming machines, to an outside network. Networking the casino to an outside network may be advantageous for a gaming entity that owns several casinos in different locations. For example, the connection of each casino to a centralized computer would provide centralized accounting of financial information for all the casinos operated by the gaming entity.

If casinos are connected to outside networks, however, it is critical that communications originating within the casino (including gaming machines and the gaming server) remain secured against misuse or tampering by an unauthorized party after the information exits the physical protection of the casino. This desire for secured communications becomes particularly important when financial information is transmitted by the casino over the outside network. Consequently, a need exists for a secure communication link between the gaming server in a casino and an outside network.

In addition, the connection between gaming machines requires various transmission and/or data protocols. These protocols are typically created as standards in the industry. However, a game manufacturer would like to control the connection between the gaming machines such that only authorized personnel can connect the gaming machines. Therefore, a need exists for a technique to control the connection between the gaming machines such that only authorized personnel can properly connect the gaming machines.

Additionally, some casino players may prefer playing a specific gaming machine. However, the player may be in a remote location and unable to travel to the casino to play. In such instances, the casino can connect a gaming machine to an outside network so that the player can connect to the outside network via a remote computer and play, even though absent from the casino. In such instances, a need exits for a secure network that provides privacy, authentication and non-repudiation so that the player can play and both the player and casino can be confident in the knowledge that the transmitted information is secure and that the rules of the game will be upheld with integrity.

SUMMARY OF THE INVENTION

The present invention provides a method and apparatus that allows secure communication in a casino between networked gaming machines and a gaming server. With the present invention, privacy is ensured; communication is authenticated; and messages cannot be repudiated.

Additionally, the present invention discloses a method and apparatus that provides secure communications between the casino and an outside network. The present invention is especially advantageous if the gaming entity manages machines at multiple casinos in different locations and the gaming entity requires quick, yet secure retrieval of information over the outside network.

In addition, the present invention provides a method and apparatus for secure communications between each gaming machine. In this regard, this secure communication allows for the connection between the gaming machines to be controlled by the game manufacturer such that the gaming machines cannot be connected unless the cryptographic technique used to secure the communications between the gaming machines is known.

Lastly, the present invention provides secure communications between the casino and a remote player over an external network. The present invention is especially critical in ensuring that transmitted information between player and casino is kept confidential and indecipherable by unauthorized individuals intercepting the transmitted information.

The present invention provides a casino gaming system having a plurality of gaming machines. In the Asymmetric case, a gaming server is provided that includes a plurality of long term keys from which it may generate keys used to communicate between gaming machines and also between the gaming machines and server. Prior to use, each of the keys is time stamped. The gaming server also includes a random number generator that is used to facilitate generation of the keys. The gaming server also includes an encryption algorithm.

A network bus is provided that interconnects the gaming machines and the gaming server. The network bus provides a communication link for transmitting information between the gaming machines and the gaming server. The gaming server uses the encryption algorithm to encrypt the keys and transmits the encrypted keys over the network bus to the gaming machine. Likewise, the gaming machines use the keys to encrypt information and transmit the encrypted information over the network bus. In one aspect, the encrypted information is transmitted via the network bus to another of the gaming machines. In another aspect, the encrypted information is transmitted via the network bus to the gaming server.

In another embodiment, the casino gaming system includes an outside network that is connected to the gaming server. A remote computer is also provided that connects to the outside network so that the encrypted information is transmitted over the network bus and the outside network to the remote computer. In one aspect, the outside network comprises the Internet.

In another embodiment of the present invention, the gaming server is a certificate authority server having a memory. In this aspect, the keys are public keys of asymmetric key pairs which are stored in the memory at the certificate authority server. In addition, the certificate authority server may generate and transmit the public keys over the network bus to the gaming machines, or the public/private key pairs may be generated by a third party and delivered to the certificate authority for authentication.

In a further embodiment of the present invention, a plurality of access switches are each connected to a different one of the gaming machines. The network bus is connected to the gaming server and each of the access switches. In this embodiment, an outside network is connected to the gaming server and the access switches provide a communication link between specific gaming machines and a remote computer over the outside network when the specific gaming machine is idle, so as to enable a remote player of the remote computer to play the specific gaming machine.

DETAILED DESCRIPTION OF THE PREFERRED EMBODIMENT

I. Overview

Figure 1:
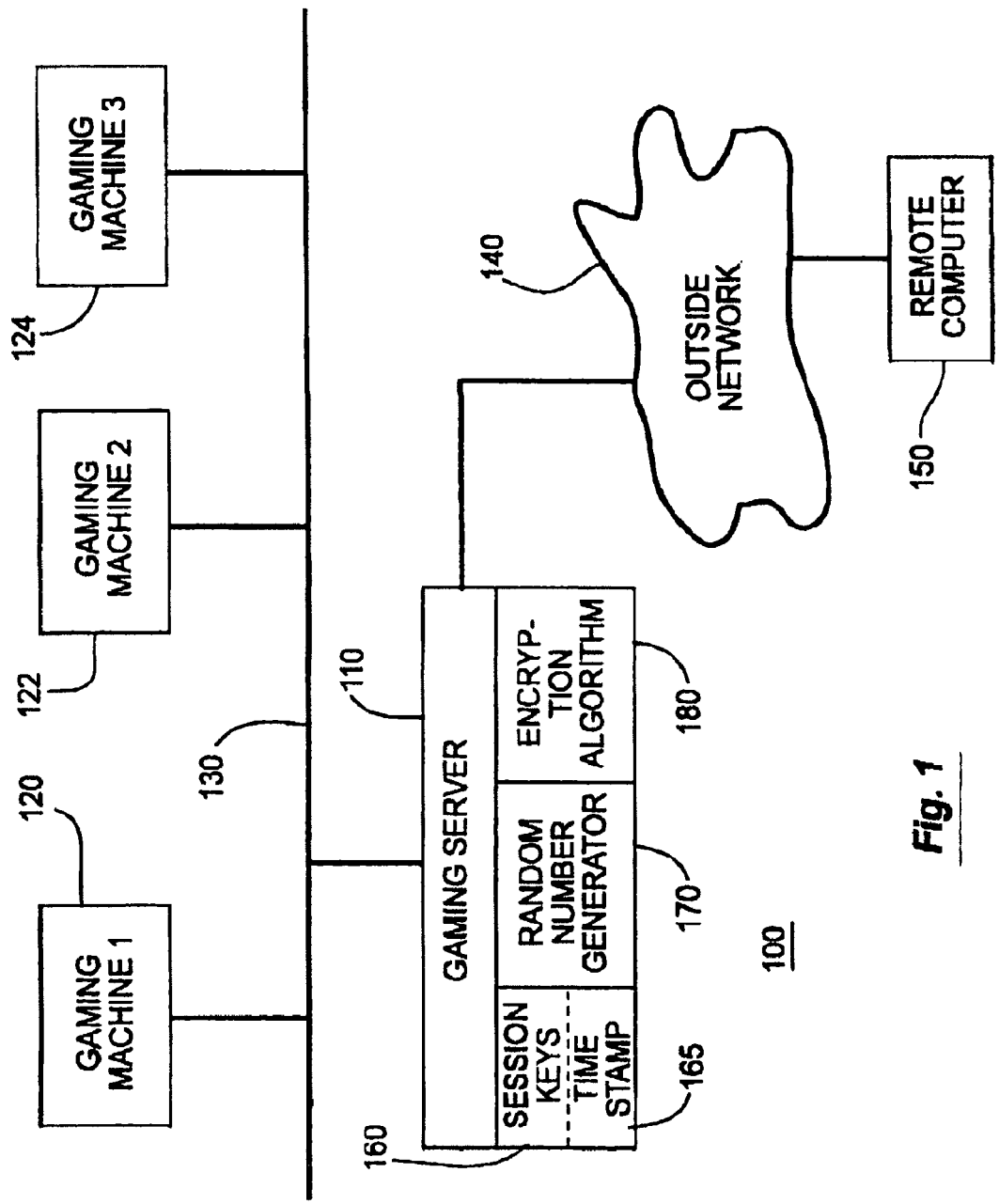
FIG. 1 illustrates one embodiment of the casino gaming system of the present invention.

In FIG. 1, a highly simplified gaming system 100 includes a gaming server 110 that is connected to a plurality of gaming machines 120-124 via network bus 130. The gaming server 110 can comprise, for example, a micro-computer or a network server. The connection of the gaming server 110 to network bus 130 can comprise, for example, a hard-wired communication link connection or a wireless communication link connection. The network bus 130 also connects to the plurality of gaming machines 120-124 that are located in a casino. In one embodiment, the gaming machines 120-124 can comprise conventional stand-alone gaming machines that are networked to the gaming server 110 via the network bus 130. The gaming machines 120-124 can also allow play of various conventional casino games such as, but not limited to, slots, poker, blackjack, etc.

In one embodiment, the casino gaming system 100 can also includes an outside network 140, such as, for example, the Internet, a Local Access Network (LAN) or a Wide Area Network (WAN). At least one remote computer 150 is connected to the outside network 140. In one embodiment, the connection of the remote computer 150 to the outside network 140 also enables the remote computer 150 to connect to the gaming server 110, and hence, the network bus 130 and the gaming machines 120-124. In this embodiment, a remote player of the remote computer 150 can play a specific one of the gaming machines 120-124 on the network bus 130 through the connection to the outside network 140. As such, a remote player can play a specific one of the gaming machines 120-124 via an outside network 140 without having to be physically in the casino.

The connection between the network bus 130 and the gaming server 110 is conventionally known in the art, and the connection can include other equipment (not shown) such as, for example a router. The connection between the gaming server 110 and the outside network 140 is also know in the art, and the connection can include various security features, such as, for example, a firewall. The connection between the remote computer 150 and the outside network 140 can include, for example, a hardwire connection, a wireless connection or a modem connection. It should be appreciated that the present invention is not limited to the manner in which the components are connected, since such connection of the components is known in the art.

In the gaming system 100 of the present invention, information that is transmitted over the network bus 130 and the outside network 140 must be secure, especially with regard to financial information, such as, for example, player credit card information, player wagering information and casino pay-out information. To ensure a secure transmission of information over the network bus 130 and the outside network 140, the information is encrypted using various cryptography techniques. Key cryptography and certificate authority techniques are described below with regard to secure encrypted information transmission in a casino gaming system 100.

II. Key Cryptography

A. Casino Gaming System Using Keys

In FIG. 1, the casino gaming system 100 includes a network 130 that interconnects gaming machines 120-124 and gaming server 110. The network bus 130 provides a communication link for transmitting information between the gaming machines 120-124, themselves, and between the gaming machines 120-124 and the gaming server 110. It should be noted that the computational capabilities of the gaming server 110 should generally exceed those of the gaming machines 120-124, at least with respect to cryptographic operations. In this regard, many computer systems have architecture and/or use compilers that physically limit the bit length of an integer, such as, for example, 32 bit length. However, key cryptography requires the use of very large integers having a bit length such as, for example, 64 or 256 bits. To enable these computer systems to arithmetically manipulate these integers, cryptographic primitives are required. Cryptographic primitives include algorithms that process large integers during various arithmetic processes. It should also be noted that these cryptographic primitives can be any algorithm that allows processing of large bit length integers by these bit-limited computer systems.

However, these primitives should be able to support Rivest, Shamir, and Adleman (RSA), El Gamal and other known key cryptographic algorithms. It should also be appreciated that the present invention is not limited by the algorithms and/or cryptography used to manipulate these large bit length integers, and the present invention encompasses any technique known and practiced in the art.

The gaming server 110 also includes keys 160. For example, the keys 160 can comprise, as will be described later, symmetric keys, asymmetric keys or session keys. The keys 160 include a time stamp 165 that indicates a period of time for which each of the keys 160 is valid. The time stamp 165 also ensures that the keys 160 are changed on a periodic basis to provide a more secure communication link.

The gaming server 110 also includes a random number generator 170 that is used by the gaming server 110 to generate the keys 160. The random number generator 170 can comprise a pseudo-random number generator and/or a random number generator that has been approved by a governmental regulation agency. The generation of the keys 160 by using the random number generator 170 is known in the art and the present invention should not be limited to anyone technique for generating the keys 160. It should also be appreciated that in another embodiment the random number generator 170 is optional. In this embodiment, the gaming server 110 receives the keys 160 from another device (not shown) connected to the network bus 130.

It should also be appreciated that the gaming server 110 can also include an encryption algorithm 180. The gaming server 110 uses the encryption algorithm 180 to encrypt information or data before it is transmitted over the network bus 130. The encrypted information is decrypted before it is used. The encryption algorithm 180 can comprise, for example, a symmetric key or one of an asymmetric key pair as will be explained herein below.

In one embodiment, the gaming server 110 transmits at least one of the keys 160 over the network bus 130 to a gaming machine 120. It should be appreciated that the gaming server 110 can transmit one of the keys 160 to anyone of the gaming machines 120124 on the network bus 130. However, for ease of description, this discussion will focus on transmission to gaming machine 120.

In this embodiment, the gaming machine 120 uses the keys 160 to encrypt information, such as, player credit card information, player identification information, wagering information and casino payout information. This encrypted information is transmitted over the network bus 130.

In one aspect, the encrypted information is transmitted over the network bus 130 to the gaming server 110. In another aspect, the encrypted information is transmitted over the network bus 130 from gaming machine 120 to another of the gaming machines 122-124. At the other gaming machine 122-124, the encrypted information is decrypted based on the type of key 160 used as will be described herein below.

In another embodiment, the casino gaming system 100 includes an outside network 140 that is connected to the gaming server 110. The outside network 140 is connected to a remote computer 150. The outside network 140 comprises, for example, the Internet, a local access network (LAN) or a wide area network (WAN). In this embodiment, the gaming server 110 includes various known security mechanisms (not shown), such as, a firewall.

In this embodiment, the gaming server 110 transmits the key 160 to gaming machine 120. The gaming machine 120 encrypts information using the key 160 and transmits the encrypted information over the network bus 130. In one aspect of the present invention, the encrypted information is transmitted to the gaming server 110. In another aspect of the present invention, the encrypted information is transmitted by the gaming machine 120 to another of the gaming machines 122-124 on the network bus 130. In even another aspect, the encrypted information is transmitted to the outside network 140 and, ultimately, to the remote computer 150. Once the encrypted information has been received, it is decrypted based on the type of key 160 used, as will be described herein below. The information is then processed as required.

1. Symmetric Keys

As explained above, the keys 160, in one embodiment, comprise symmetric keys. Symmetric keys, also termed private keys, use a unique key to encrypt and exchange information between two parties. In this embodiment, gaming machine 120 (the sender) and gaming server 110 (the recipient) share a symmetric key k which is secret. In this embodiment, the gaming machine 120 encrypts information m before transmitting it over the network bus 130 to the gaming server 110. If symmetric encryption algorithm E and symmetric key k are used, the encryption of m by E under k is denoted $c=E_k(m)$ where c represents the cipher-text associated with information m. Therefore, gaming machine 120 transmits cipher-text c over the network bus 130 to the gaming server 110. At the gaming server 110, the cipher-text c is decrypted using the symmetric key k. The gaming server 110 applies the decryption algorithm $m=E_k^{-1}(c)$ to decrypt cipher-text c and obtain information m.

In addition, the symmetric key k can also be a session key. A session key is used for a specific exchange of a message m between two parties, such as, two gaming machines 120 and 122 or between a gaming machine 120 and the gaming server 110. In this embodiment, gaming machine 120 desires to communicate with gaming machine 122. The gaming server 110 contains a symmetric encryption function, E, that allows the encryption of a session key, k, that will be sent by the gaming server 110 in an encrypted format to gaming machines 120 and 122. In this embodiment, $E_k(m)$ represents the encryption of message m under encryption algorithm E using key $k_i$, and $E_{k_i}^{-1}(m)$ represents the decryption of message m under encryption algorithm E using key $k_i$. In order to allow the communication between gaming machines 120 and 122, the gaming server 110 generates a new unique session key k, and the gaming server 110 sends $E_{k1}(k)$ to gaming machine 120 and $E_{k2}(k)$ to gaming machine 122. The gaming machines 120 and 122 each can recover the session key k by forming $k=E_{k1}^{-1}(E_{k_2}(k))=E_{k_{21}}^{-1}(E_{k_2}(k))$. Using the session key k, gaming machine 120 can communicate message m to gaming machine 122 by sending $E_k(m)$ to gaming machine 122, gaming machine 122 can form $m=E_k^{-1}(E_k(m))$ to recover the message. It should be appreciated that this technique can be used with communications between any device connected to the network bus 130 and should not be limited to communications between only gaming machines 120 and 122. In addition, in one embodiment, the gaming server 130 generates the session key k using the long term asymmetric key 160 as a seed to random number generator 170. In another embodiment, the gaming server can use anyone way function that is non-invertable to generate the session key k. However, it should be appreciated that the present invention can use any technique known in the art to generate the session key k, and the present invention should not be limited to only those disclosed. It should be noted that the cipher-text c is described as being transmitted only from the gaming machine 120 to the gaming server 110. However, it should be understood that the cipher-text c can be transmitted from the casino gaming server 110 to the gaming machine 120 using the same symmetric key 160. Moreover, it should be appreciated that cipher-text c can be transmitted from anyone of the gaming machines 120-124 to the gaming server 110 or vise versa using the symmetric key 160. In addition, the cipher-text c can be transmitted from the gaming machines 120-124 or the gaming server 110 to the outside network 140 and the remote computer 150 (or vise versa) using the symmetric key 160 as described above. It should further be appreciated that the encryption algorithm 180 used by the gaming server 110 to encrypt and transmit the keys 160 to the gaming machines 120-124 can comprise a symmetric key 160, and the key 160 can be encrypted and/or decrypted as described above with reference to information m. In a preferred embodiment, the symmetric key 160 uses the Data Encryption Standard (DES) or one of the variants of DES such as triple-DES, DES-X or Advanced Encryption Standard (AES).

2. Asymmetric Keys

As mentioned above, the keys 160 can comprise asymmetric keys. Asymmetric keys, also termed public keys, use two different keys in a transaction. The asymmetric key pair consists of a public and a private key. The public key is made available to all devices on the network bus 130 and the outside network 140 while the private key is kept secret. The essential feature of a public key cryptographic system is that knowledge of a public key does not provide computational information about the private key.

In this embodiment, the asymmetric key pair 160 is represented by (u,r) where u represents the public key and r represents the private key. The gaming machine 120 acquires the public key u of the gaming server 110 from the gaming server 110 or another device (not shown) connected to the network bus 130 or the outside network 140. The gaming machine 120 encrypts information m using public key algorithm E. As a result, the cipher-text c is c=Eu (m). The cipher-text c is transmitted to the gaming server 110 over the network bus 130. The private key algorithm $E_r^{-1}$ is used by the gaming server 110 to decrypt the cipher-text c and therefore obtain the information m=$E_r^{-1}(E_u(m))$. In this embodiment, it should be appreciated that each of the gaming machines 120-124, the gaming server 110 and the remote computer 150 have a unique asymmetric key pair (u,r). The public key u is provided to the sending party and only the private key r can decrypt information encrypted by the public key u. It should also be appreciated that the asymmetric key technique can be used by any device connected to the network bus 130 or the outside network 140 so long as the appropriate public key u is used to encrypt the information m and the cipher-text c is sent to the device having the corresponding private key r.

In addition, it should also be appreciated that the encryption algorithm 180 can comprise the public key u of the asymmetric key pair (u,r). The gaming server 110 encrypts the key 160 using the public key u and transmits the encrypted key 160 to the appropriate gaming machine 120-124 or remote computer 150 having the corresponding private key r. In a preferred embodiment of the present invention, the asymmetric keys 160 comprise Rivest, Shamir, and Adleman (RSA) and El Gamal asymmetric algorithms.

3. Digital Signatures

In another embodiment, the keys 160 can comprise a digital signature. A digital signature can be constructed by reversing the asymmetric key technique described above. In this embodiment, the gaming machine 120 uses the private key algorithm $E_r^{-1}$ to encrypt the information m where the cipher-text is c=$E_r^{-1}(m)$. The cipher-text c is transmitted to the gaming server 110 where the cipher-text c is decrypted to obtain information m by applying the public key algorithm m=Eu($E_r^{-1}(m)$). Since the private key algorithm $E_r^{-1}$ is only known by the gaming machine 120, the gaming server 110 can be particularly certain that the information m was sent by the gaming machine 120 because only the public key algorithm Eu is able to decrypt cipher-text c that has been encrypted using the private key algorithm $E_r^{-1}$.

As shown above, the digital signature is a variation of the asymmetric key technique described above and can be fully implemented using asymmetric keys. The digital signature provides an extra security feature that allows the receiving party to verify the sending party. This technique is particularly useful in the casino gaming system 100 when financial information, such as, credit card information, is being transmitted over the network bus 130.

It should be appreciated that the digital signature has been disclosed with reference to the gaming machine 120 and the gaming server 110 but should not be limited as such. The digital signature can be used by all devices connected to the network bus 130 and/or the outside network 140. In addition, the encryption algorithm 180 used by the gaming server 110 to encrypt and transmit keys 160 over the network bus 130 can comprise a digital signature.

B. Method For Using Keys

Figure 2:
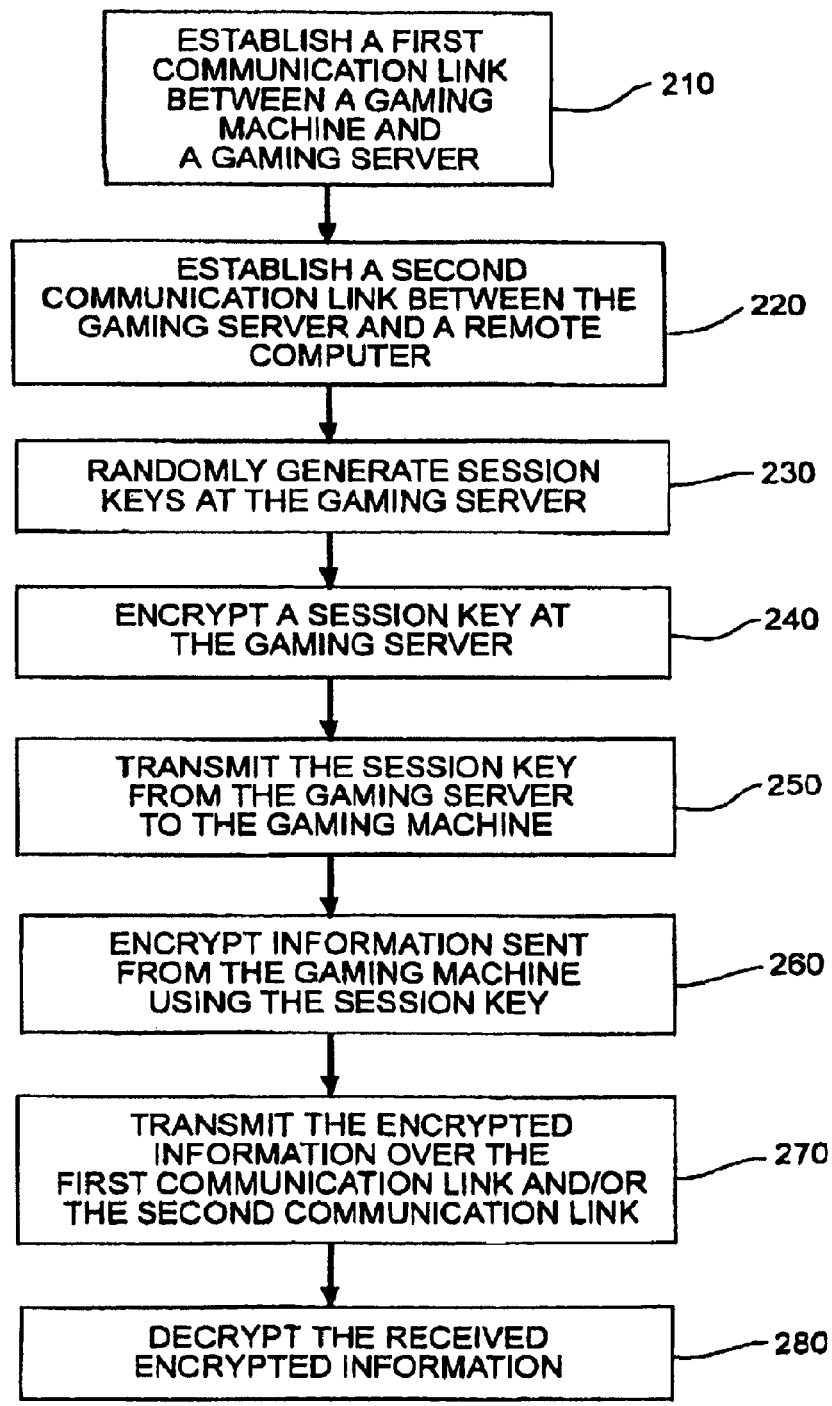
FIG. 2. is a flow chart showing a method for communicating information using a casino gaming system of the present invention.

As shown in FIG. 2, the present invention includes a method for communicating information using a casino gaming system 100 having gaming machines 120-124 and a gaming server 110. The method includes establishing a first communication link (network bus 130 in FIG. 1) between the gaming machines 120-124 and the gaming server 110 (step 210). A second communication link (outside network 140 in FIG. 1) is established between the gaming server 110 and the remote computer 150 (step 220). It should be appreciated that the outside network 140 can comprise the Internet, a local access network (LAN) or a wide area network (WAN).

The gaming server 110 includes keys 160. In one embodiment, the gaming server 110 includes a random number generator 170 that randomly generates the keys 160 (step 230). The gaming server 110 can also include an encryption algorithm 180 that is used to encrypt the keys 160 at the gaming server 110 (step 240). It should be appreciated that the keys 160 and the encryption algorithm 180 can comprise symmetric keys or asymmetric keys that function as described herein above.

The key 160 is transmitted from the gaming server 110 to, in one embodiment, a gaming machine 120 (step 250). It should be appreciated that the gaming server 110 can transmit the key 160 to any other device connected to the network bus 130 or the outside network 140. The key 160 is used by the gaming server 110 to encrypt information sent from the gaming machine 120 (step 260). The encrypted information is transmitted over the first communication link (network bus 130) and/or the second communication link (outside network 140) (step 270). It should be appreciated that the encrypted information can be transmitted to another of the gaming machine 122-124, the gaming server 110 or the remote computer 150. Once the encrypted information is received, it is decrypted by the receiving device (such as, for example, gaming server 110) using a technique based on the type of key 160 used as described herein above (step 280).

It should be appreciated that the method described with reference to gaming machine 120 and gaming server 110 is only for ease of description and should not be interpreted as being limited as such. It should be appreciated that the above described method can be used by any device connected to the network bus 130 and/or the outside network 140.

III. Certificate Authority

Figure 3:
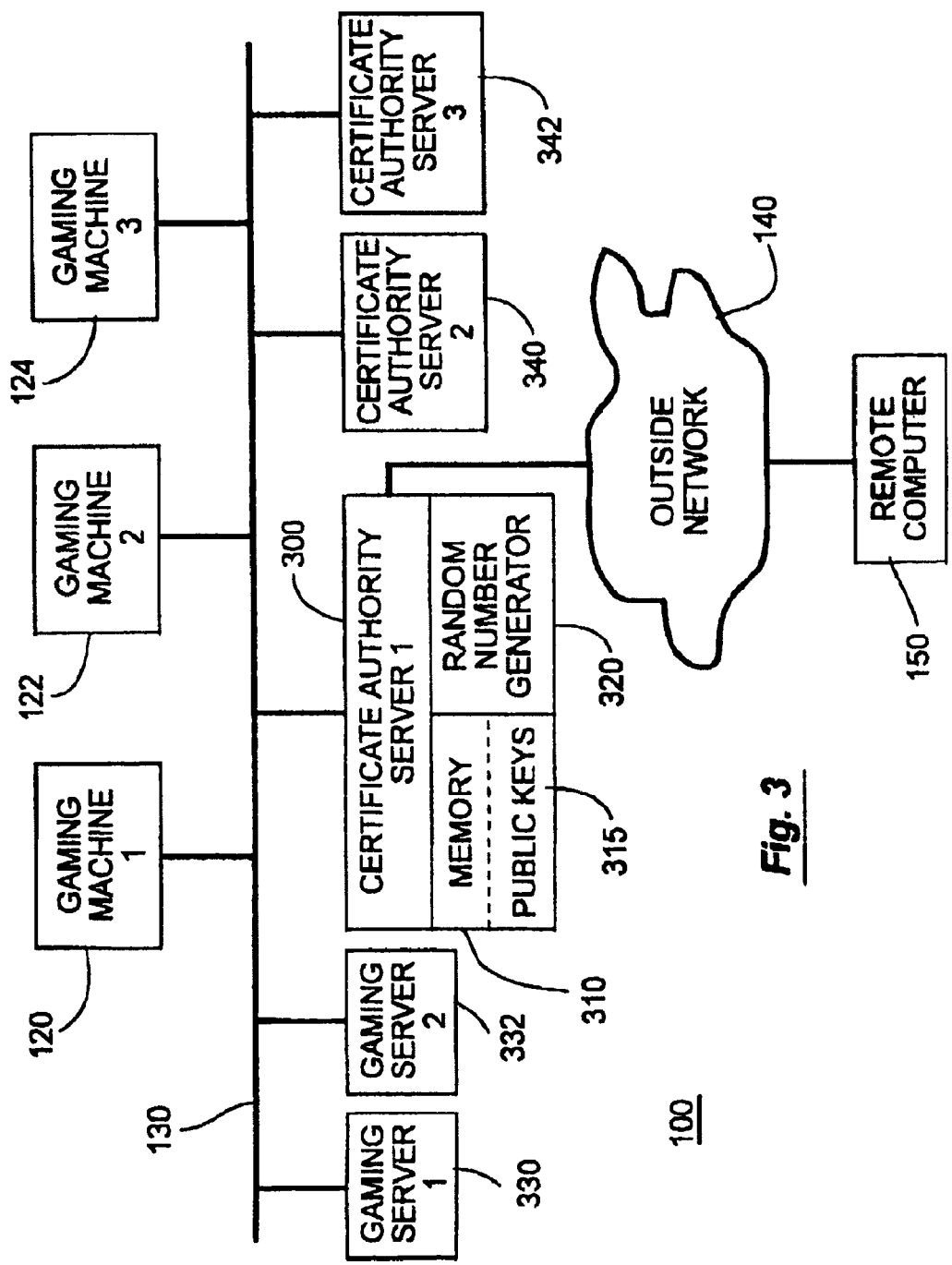
FIG. 3 illustrates an embodiment of the casino gaming system of the present invention using a certificate authority server.

In general, as shown in FIG. 3, a certificate authority server 300 guarantees the identity of a device connected to the network bus 130 or connected to the outside network 140. The certificate authority 300 guarantees the identity by granting a unique public key 315 to each of the devices (as shown in FIG. 3, such as, gaming machines 120-124, gaming servers 330-332 and certificate servers 340-342) connected to the network bus 130. The certificate authority server 300 can also grant a unique public key to certain devices (such as remote computer 150) that are connected to the outside network 140. As noted above, there can be other certificate authority servers 340 and 342 connected to the network 130. All the certificate authority servers 300, 340 and 342 can be connected in a hierarchical configuration which is known in the art. In addition, there may be gaming servers 330-332 that do not have the ability to guarantee the identity of a device connected to the network bus 130. However, these gaming server 330-332 have the ability to perform other operations on the network bus 130, as described above with reference to FIG. 1.

A. Casino Gaming System using a Certificate Authority

As shown in FIG. 3, another embodiment of the casino gaming system 100 includes a certificate authority server 300 that is used for communicating information using asymmetric key pairs including a private key and a public key. In this embodiment, a network bus 130 interconnects the certificate authority 300 and the gaming machine 120-124. The network bus 130 can also be connected to other certificate authority servers 340-342 and gaming servers 330-332. The certificate authority server 300 includes a memory 310 that stores public keys 315. The public keys 315 can also include a time stamp (not shown) that indicates a time period that the asymmetric key pair is used. The certificate authority server 300 also includes a random number generator 320 that is capable of generating the asymmetric key pairs of the present invention.

The certificate authority server 300 is also connected to an outside network 140 and a remote computer 150 is connected to the outside network 140. The outside network 140 can comprise the Internet, a local access network (LAN) or a wide area network (WAN). In another embodiment, it should be appreciated that the outside network 140 can connect to a gaming server 330-332 or another certificate authority server 340-342. The certificate authority server 300 can include other security mechanisms (not shown) to facilitate connection to the outside network 140, such as, for example, a firewall. The remote computer 150 can connect to the outside network 140 via, a hard wired connection, a wireless connection or a modem connection.

For ease of discussion, the certificate authority server 300 will be described with regard to transmissions to and from gaming machine 120 and gaming server 330. However, it should be appreciated that the certificate authority server 300 can transmit to any device on the network bus 130 and/or the outside network 140, and these devices can communicate using the same techniques as previously described with regard to the gaming machine 120 and the gaming server 110 (in FIG. 1).

In the present embodiment, when the gaming machine 120 desires to communicate with the gaming server 330, the gaming machine 120 requests a public key 315 from the certificate authority server 300. The certificate authority server 300 transmits a public key 315 to the gaming machine 120. The public key 315 is used by the gaming machine 120 to communicate with the gaming server 330 connected to the network bus 130. Prior to transmission of the pubic key 315, the certificate authority server 300 has verified the identity of the gaming server 330 and granted a unique asymmetric key pair to the gaming server 330. The verification is accomplished using various techniques known in the art. As a result of this verification, the certificate authority server 300 can guarantee the identity of the gaming server 330 and the validity of the public key 315 that is to be used by the gaming machine 120 to communicate with the gaming server 330.

In addition to transmitting the public key 315, the certificate authority server 300 signs the public key 315. The signing of the public key 315 uses an encryption algorithm that is similar to the symmetric and asymmetric keys, such as, a digital signature, as described above. Once the gaming machine 120 receives the signed public key 315, the public key 315 is validated using, as described above, symmetric or asymmetric key techniques. The gaming machine 120 uses the public key 315 to encrypt information and transmits that information over the network bus 130 to the gaming server 330.

As explained above, the gaming machine 120 can communicate with any other device connected to the network bus 130 and/or the outside network 140. However, these other devices must also be verified by the certificate authority server 300. As a result, the gaming machine 120 receives the appropriate public key 315 and transmits encrypted information to the appropriate device, such as, for example, other gaming machines 122-124, gaming severs 330-332, certificate authority servers 300, 340-342 and remote computer 150. In a preferred embodiment, the certificate authority server 330 meets the X.509 (ISO/IEC 9594-8) standard.

IV. Remote Access

Figure 4:
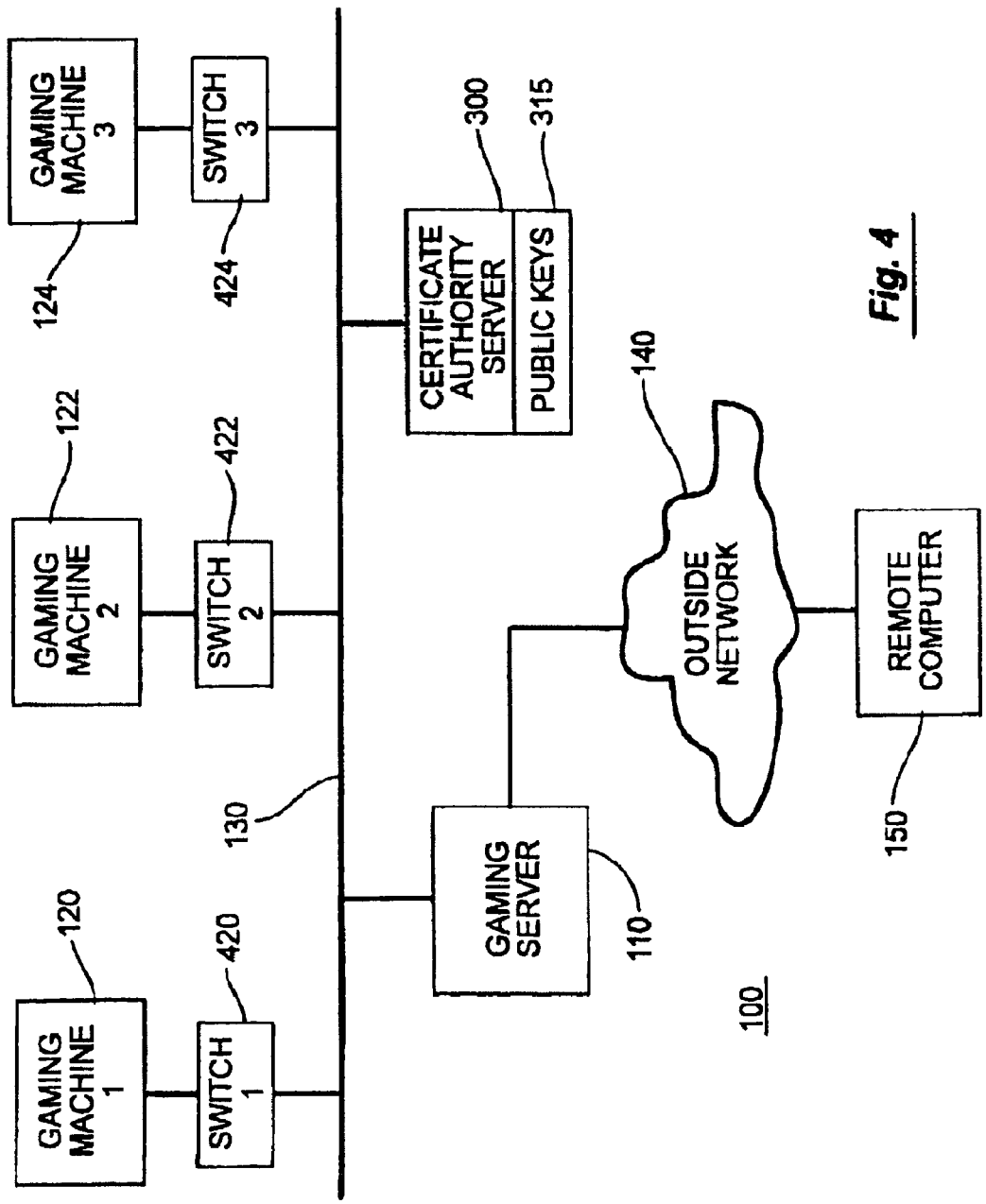
FIG. 4 illustrates another embodiment of the casino gaming system of the present invention.

As shown in FIG. 4, another embodiment of the casino gaming system 100 includes switches 420, 422 and 424 that enable a remote player using a remote computer 150 to connect to and play a specific gaming machine 120-124 that is located in a casino.

A. Remote Access Casino Gaming System

In this embodiment, shown in FIG. 4, a network bus 130 interconnects a gaming server 110 and switches 420, 422 and 424. A certificate authority server 300 is also connected to the network bus 130. The certificate authority server 300 provides public keys 315 used for encrypting communications, as described above. The switches 420, 422 and 424 are connected to gaming machine 120, 122 and 124, respectively. In a preferred embodiment, the gaming machines 120, 122 and 124 are located in a casino. However, the physical location of the gaming machines 120, 122 and 124 should not be interpreted as limiting the present invention. The gaming server 110 is connected to an outside network 140 and a remote computer 150 is connected to the outside network 140.

In another embodiment, the outside network 140 can connect to the certificate authority server 300. The gaming server 110 can have various security features to facilitate connection to the outside network 140, such as, for example, a firewall. The outside network 140 can comprise the Internet, a local access network (LAN) or a wide area network (WAN). The remote computer 150 can be connected to the outside network 140 via a hard wired connection, a wireless connection or a modem connection.

The present invention allows a remote player using a remote computer 150 to connect to and play a specific gaming machine 120-124 in a casino. For ease of description, the remote computer 150 will be described as connecting to gaming machine 120. However, it should be noted that the present invention encompasses the remote computer 150 connecting to any of the gaming machine 122-124 that are connected to the outside network 140. As such, the remote computer 150 connects to the outside network 140 which is connected to the gaming server 110. The remote computer 150 can be located in the casino, or the remote computer 150 can be located remotely from the casino, such as, but not limited to, a hotel connected to the casino.

To play the gaming machine 120, the remote computer 150 makes a request to the gaming server 110 to gain access to gaming machine 120. The request made by the remote computer 150 can include entering identification information that uniquely identifies the remote player of the remote computer 150. The identification information can comprise a password, credit card information, etc.

The gaming server 110 compares the identification information with a database. The database can include a listing of all passwords, a credit check of the credit card information or casino-specific credit information. If the identification information matches one of the entries in the database, the remote computer 150 is given access to the gaming machine 120 through switch 420.

It should be appreciated that, in another embodiment, the switch 420 disconnects the gaming machine 120 from access by the remote computer 150 when the gaming machine 120 is being used in the casino. The disconnection of the gaming machine 120 can be initiated by a casino player in the casino. In this embodiment, if a casino player in the casino does not want a remote player connecting to the gaming machine 120, the casino player can activate switch 420 to prevent a remote player from accessing the gaming machine 120.

In addition, governmental regulation may require that only one person at a time can play a gaming machine 120 in the casino. In this case, the remote computer 150 receives a gaming machine unavailable signal when the gaming machine 120 is occupied and/or not idle, and the remote computer 150 is asked to choose another gaming machine 122-124. Conversely, if a remote computer 150 is accessing the gaming machine 120, a casino player cannot play the accessed gaming machine 120. In the casino, this disconnection is indicated by a light (not shown) or other indicators that verify that the gaming machine 120 is unavailable.

Once the remote computer 150 gains access to the gaming machine 120, the remote player can play the gaming machine 120. In one embodiment during play of the gaming machine 120, the remote player views a digital representation of the game being played on the gaming machine 120. The remote player can view and interact with the gaming machine 120 via other mechanisms that are known in the art.

The present invention should not be interpreted as being limited to the manner in which the remote player views and interacts with the play of the gaming machine 120. Furthermore, if the gaming machine 120 breaks down or malfunctions during play, the gaming machine 120 sends a signal to the remote computer 150 indicating that the gaming machine 120 is no longer available and the remote player is asked to play another game and is credited any winnings from the gaming machine 120.

In addition, the communication between the remote computer 150 and the gaming machine 120 can be encrypted using symmetric or asymmetric keys as described herein above. The gaming server 110 or the gaming machine 120 can document information with regard to the wagering during .remote play of the gaming machine 120. Such information can include identification information about the remote player, amounts wagered, the time the remote player plays the gaming machine 120 and the location from which the remote player is playing the gaming machine 120.

B. Method Remotely Accessing Casino Gaming System

Figure 5:
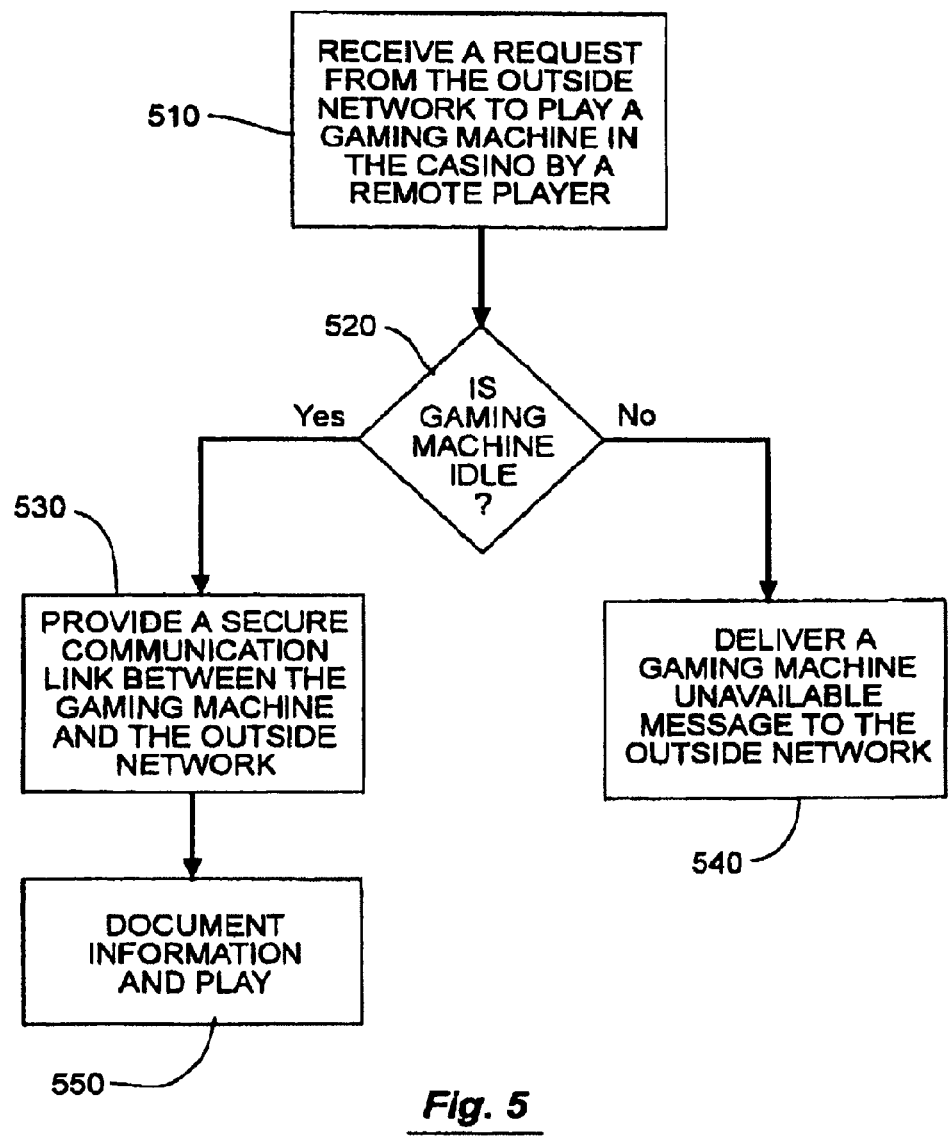
FIG. 5 is another embodiment of a method for communicating using the casino gaming system of the present invention.

As shown in FIG. 5, a method is provided that allows a remote player to access and play a specific gaming machine 120-124 from a remote location. In this method, a request is received from an outside network 140 to access and play a gaming machine 120-124 (step 510). The request from the outside network 140 may be initiated by the input of identification information. The identification information can comprise a password, credit card information, etc. The gaming server 110 compares the identification information with a database.

The database can comprise a listing of all passwords, a credit check of the credit card information or casino-specific credit information. If the identification information matches one of the entries in the database, the remote computer 150 is given access to the gaming machine 120 through switch 420. It should be appreciated that, in another embodiment, the switch 420 disconnects the gaming machine 120 from access by the remote computer 150 when the gaming machine 120 is being played in the casino. It should further be appreciated that the present invention is not limited to the type of request that is made by the remote computer 150 for access to the gaming machine 120.

Based on the request, a secured communication link is provided between the outside network 140 and the gaming machine 120-124 (step 530). In one embodiment, the secured communication link is only provided if the gaming machine 120-124 is idle and/or not being played by another player (step 520). In this embodiment, if the gaming machine 120 is not idle, a gaming machine unavailable message is provided to the outside network 140 (step 540). Additionally, the remote player can be asked to choose another of the gaming machines 122-124.

Once the outside network 140 accesses a gaming machine 120-124, information can be documented (step 550). The information can include identification information about the remote player, amounts wagered, the time the remote player plays the gaming machine 120 and the location from which the remote player is playing the gaming machine 120. When the remote player begins to play, the player views a digital representation of the gaming machine 120.

The foregoing discussion of the invention and as presented in Exhibit A (incorporated herein by reference) has been presented for purposes of illustration and description. Further, the description is not intended to limit the invention to the form disclosed herein. Consequently, variation and modification commensurate with the above teachings, within the skill and knowledge of the relevant art, are within the scope of the present invention.

The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

What is claimed is:

1. A casino gaming system, comprising:
   at least one gaming machine configured to determine an outcome of a game;
   a gaming server including a plurality of keys and configured to receive a request to initiate game play on a gaming machine from a remote machine, wherein the remote machine is separate from the gaming machine; and
   a network bus configured to interconnect said at least one gaming machine and said gaming server, said network bus used to transmit information between said at least one gaming machine and said gaming server,
   said gaming server configured to transmit at least one of said plurality of keys over said network bus to said at least one gaming machine, said at least one gaming machine is further configured to use said at least one of said plurality of keys to encrypt said information and wherein said at least one gaming machine is further configured to transmit said encrypted information over said network bus to said remote machine.

2. The casino gaming system, as claimed in claim 1, wherein said plurality of keys are session keys.

3. The casino gaming system, as claimed in claim 1, wherein said plurality of keys comprise asymmetric key pairs.

4. The casino gaming system, as claimed in claim 1, wherein said gaming server is interconnected to an outside network.

5. The casino gaming system, as claimed in claim 1, wherein each of said plurality of keys includes a time stamp, said time stamp indicating a period of time for which each of said plurality of keys is used.

6. The casino gaming system, as claimed in claim 1, wherein said gaming server further comprises a random number generator that generates said plurality of keys.

7. The casino gaming system, as claimed in claim 1, said gaming server further comprising:
   an encryption algorithm, said gaming server using said encryption algorithm to encrypt said at least one of said plurality of keys,
   said gaming server transmitting said encrypted at least one of said plurality of keys over said network bus to said at least one gaming machine.

8. The casino gaming system, as claimed in claim 1, wherein said encrypted information is transmitted over said network bus to another of said at least one gaming machines.

9. The casino gaming system, as claimed in claim 1, wherein said encrypted information is transmitted over said network bus to said gaming server.

10. A casino gaming system, comprising:
    a plurality of gaming machines configured to determine an outcome of a game;
    a gaming server configured to receive a request to initiate game play on a gaming machine from a remote machine, wherein the remote machine is separate from the gaming machines, said gaming server comprising:
       a plurality of keys, each of said plurality of keys including a time stamp, said time stamp indicating a period of time for which each of said plurality of keys is used;
       a random number generator that generates said plurality of keys; and
       an encryption algorithm;
    a network bus interconnecting said plurality of gaming machines and said gaming server, said network bus used to transmit information between said plurality of gaming machines and said gaming server,
    said gaming server using said encryption algorithm to encrypt at least one of said plurality of keys,
    said gaming server transmitting said at least one of said plurality of keys over said network bus to at least one of said plurality of gaming machines where said key is decrypted, said at least one of said plurality of gaming machines using said at least one of said plurality of keys to encrypt said information,
    said at least one of said plurality of gaming machines transmitting said encrypted information over said network bus to said remote machine.

11. A method for communicating information using a casino gaming system having at least one gaming machine and a gaming server, said method comprising:
    receiving a request on said gaming server from a remote machine to initiate game play on said at least one gaming machine, wherein the remote machine is separate from the gaming machine;
    establishing a first communication link between said at least one gaming machine and said gaming server;
    first transmitting at least one of a plurality of keys stored at said gaming server over said first communication link from said gaming server to said at least one gaming machine;
    encrypting information sent from said at least one gaming machine using said at least one of said plurality keys;
    determining an outcome of said game play on said at least one gaming machine;
    second transmitting said encrypted information over said first communication link from said at least one gaming machine to said remote machine;
    receiving encrypted information from said remote machine; and
    decrypting said received encrypted information using said at least one of said plurality of keys.

12. The method, as claimed in claim 11, wherein said plurality of keys include session keys.

13. The method, as claimed in claim 11, further comprising:
    randomly generating said plurality of keys at said gaming server.

14. The method, as claimed in claim 11, further comprising:
    encrypting each of said plurality of keys transmitted from said gaming server to said at least one gaming machine.

15. A casino gaming system for communicating information using asymmetric key pairs that includes a private key and a public key, said casino gaming system comprising:
    a plurality of gaming machines, each configured to determine an outcome of a game of game play and provide said outcome to a remote machine, wherein the remote machine is separate from the gaming machine;
    a certificate authority server including a memory storing at least a plurality of said public keys and at least a plurality of said asymmetric key pairs;
    a network bus interconnecting said plurality of gaming machines and said certificate authority server,
    said certificate authority server transmitting at least one of said plurality of public keys over said network bus to at least one of said plurality of gaming machines wherein said certificate authority server signs said at least one of said plurality of public keys transmitted over said network bus, said at least one of said plurality of gaming machines using said at least one of said plurality of said keys to encrypt information, said at least one of said plurality of gaming machines transmitting said encrypted information over said network bus to said remote machine.

16. The casino gaming system, as claimed in claim 15, wherein each of said plurality of gaming machines validates said at least one of said signed plurality of public keys received from said network bus.

17. The casino gaming system, as claimed in claim 15, wherein said certificate authority server is connected to an outside network.

18. The casino gaming system, as claimed in claim 15, wherein said encrypted information is transmitted over said network bus to another of said at least one gaming machines.

19. The casino gaming system, as claimed in claim 15, wherein said encrypted information is transmitted over said network bus to said gaming server.

20. The casino gaming system, as claimed in claim 15, further comprising:

an outside network connected to said gaming server; and a remote machine connected to said outside network wherein said encrypted information is transmitted over said network bus and said outside network to said remote machine.

21. The casino gaming system, as claimed in claim 15, wherein said network bus is connected to at least one gaming server, said certificate authority server transmitting at least one of said plurality of said public keys to said at least one gaming server, said gaming server encrypts information using said at least one of said plurality of said public keys, said gaming server transmits said encrypted information over said network bus.

22. The casino gaming system, as claimed in claim 15, wherein said certificate authority server comprises a random number generator for generating said plurality of said asymmetric key pairs.

23. The casino gaming system, as claimed in claim 15, wherein each of said asymmetric key pairs includes a time stamp, said time stamp indicating a period of time for which said asymmetric key pairs are used.

24. The casino gaming system, as claimed in claim 15, wherein said network bus is connected to a plurality of other certificate authority servers, said certificate authority server transmitting at least one of said plurality of said public keys to said plurality of other certificate authority servers wherein said plurality of other certificate authority servers encrypts information using said at least one of said plurality of said public keys and transmits said encrypted information over said network bus.

25. A casino gaming system connected to at least one outside computer via an outside network, said casino gaming system comprising:

a gaming server;

a plurality of gaming machines and configured to determine an outcome of a game, wherein said gaming server is configured to receive a request to initiate game play on at least one of the gaming machines from said at least one outside computer and configured to provide at least one encryption key to said at least one of the gaming machines, and wherein said at least one of the gaming machines is configured to use said at least one encryption key to communicate with said at least one outside computer, wherein the outside computer is separate from the gaming machines;

a plurality of access switches, each one of said plurality of access switches individually connected to a different one of said plurality of gaming machines; and a network bus connected to said gaming server and each of said plurality of access switches;

one of said plurality of access switches connecting one of said plurality of gaming machines and said outside computer over said outside network, so as to enable a remote player of said outside computer to play said one of said plurality of gaming machines, the other of said plurality of access switches disconnecting said outside computer from the other of said plurality of gaming machines.

26. A gaming server comprising:

a memory configured to store a plurality of keys;

a receiver configured to receive a request to initiate game play on a gaming machine from a remote machine, wherein the remote machine is separate from the gaming machine and wherein the gaming machine is configured to determine an outcome of a game; and a transmitter configured to transmit at least one of the plurality of keys to the gaming machine, wherein the gaming machine is further configured to use said at least one of said plurality of keys to encrypt information and transmit the encrypted information to the remote machine.

* * * * *